June 10, 1941.    A. T. McWANE    2,245,153
PIPE JOINT
Filed May 4, 1939    2 Sheets-Sheet 1

INVENTOR
ARTHUR T. McWANE
BY
Johnston & Jennings
ATTORNEYS

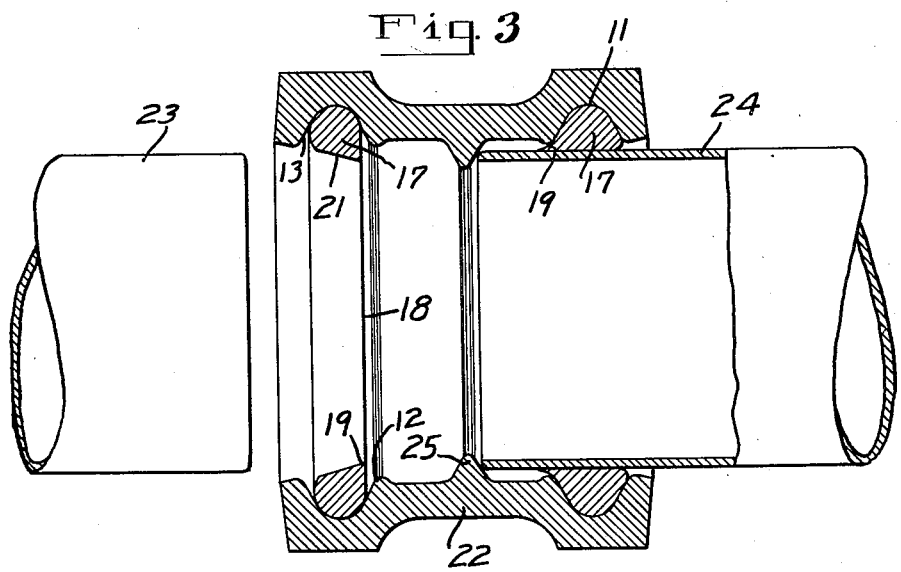
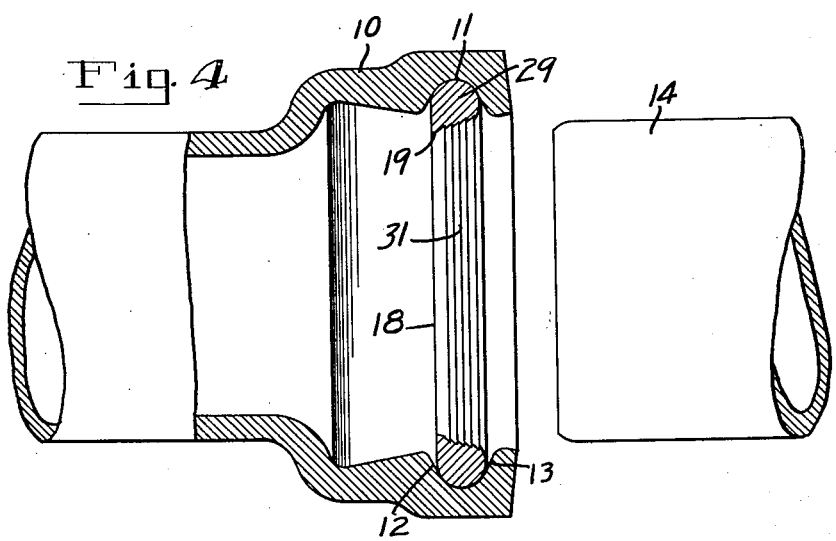

Patented June 10, 1941

2,245,153

UNITED STATES PATENT OFFICE 2,245,153

PIPE JOINT

Arthur T. McWane, Birmingham, Ala.

Application May 4, 1939, Serial No. 271,633

1 Claim. (Cl. 285—90)

This invention relates to a joint for bell and spigot type pipe, fittings, and couplings, and in particular is an improvement over my prior Patent No. 2,146,641, issued February 7, 1939. The principal object of my invention is to provide a pipe joint having all the pressure resisting qualities of the joint described in my said patent, and which, in addition, will resist separation of the bell and spigot due to high internal pressures.

In my prior patent aforesaid, there is disclosed and claimed a packing joint of the character designated embodying a bell having an annular gasket groove therein and an annular rubber gasket seated snugly in the groove and surrounding the spigot, the relative sizes of the spigot, the groove, and the gasket being such that the pressure on the gasket resulting from the insertion of the spigot causes it to be distorted and fill the groove completely, effecting a high unit pressure on the gasket. Joints embodying such gaskets have been highly successful and have been found to withstand internal pressure without leakage up to the bursting strength of the pipe.

When such joints are used for high pressures there is a tendency for the spigot end of the pipe to be pushed out of the bell unless mechanically restrained; consequently means to prevent separation of the joints where employed with such high pressures is highly desirable. I have discovered that by changing the shape of the inner bearing surface of the gasket as herein described, there is provided a joint which withstands high internal pressures without separation and without any other mechanical restraint. Joints made according to my present invention have been found to resist separation equal to or better than the bolted, gland type, joints heretofore in use.

A further advantage of my present invention resides in the fact that it is better adapted for use with bell and spigot type joints or couplings employed with plain end steel pipe. The latter pipe, because of its thin wall section, can not have its spigot end rounded off or pointed to the extent as can the relatively thick walled cast iron pipe, and is thus more difficult to enter in a gasket which is wholly circular in cross section. In accordance with my present invention, the gasket, before entry of the spigot, presents an outwardly flaring surface from the high pressure to the low pressure side, whereby a blunt spigot may be readily entered, turning the inwardly extending portion of the gasket toward the high pressure side, thereby stretching it, compressing it against the side of the groove, and forming a locking lip which resists separation of the joint. All the advantages of my prior patent with respect to withstanding high pressures without leakage are thus maintained, and in addition, I provide a joint which requires no other mechanical restraint than the gasket itself to resist separation.

Joints constructed in accordance with my invention are illustrated in the accompanying drawings forming a part of this application, in which Fig. 1 is a disassembled view of a bell and spigot type joint embodying my invention, the bell being partly in section;

Fig. 3 is a sectional view showing a coupling and associated spigots, one being assembled with the coupling and the other disassembled, and embodying my invention; and Fig. 4 is a view similar to Fig. 1, showing a modified form of gasket.

Figure 1:
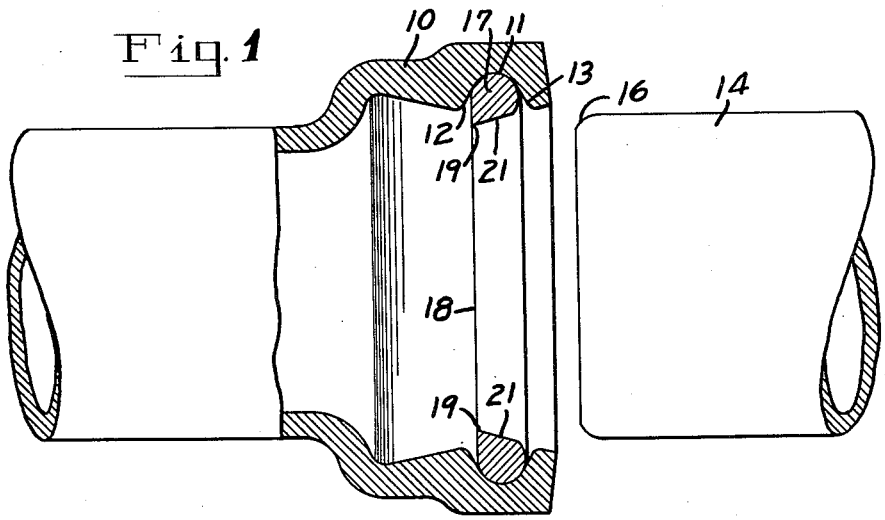
Figure 2:
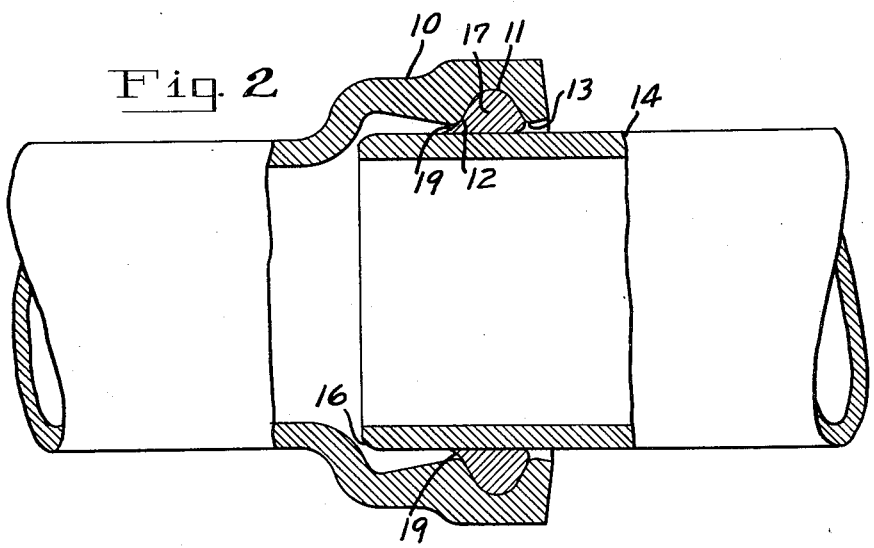
Fig. 2 is a similar view showing the bell and spigot assembled and the gasket distorted to fill the groove in the bell.

Referring to the drawings for a better understanding of my invention, I show in Fig. 1 the bell end 10 of a section of pipe. Near the outer end of the bell there is provided on the inner surface an annular groove 11 which, as shown, is arcuate in cross section at the bottom and is provided with flaring sides 12 and 13, the side 12 forming a shoulder with the adjacent inner surface of the bell. The cooperating spigot is shown at 14 and the end thereof is rounded off, as shown at 16, in order to facilitate its entry into the bell 10. As will be seen in Fig. 2, the spigot 14 has just sufficient clearance with respect to the bell 10 that it may freely enter the bell.

Seated within the groove 11 is a gasket 17, which, as shown, is arcuate in cross section at its outer periphery where it fits in the bottom of the groove 11 and the high pressure side 18 thereof extends radially inward of the bell a considerable distance so as to provide an inwardly extending lip 19. To make the entry of the spigot easier, the inner surface of the gasket 17 is flared outwardly from the lip 19 to the low pressure side thereof along the regular line 21.

As will be seen from the drawings, the outside of spigot 14 is substantially the same diameter as the inner diameter of the gasket 17 at its greatest inside dimension. When the spigot 14 is entered into the gasket 17, it accordingly stretches the gasket and distorts it to the form shown in Fig. 2 of the drawings, where, it will be seen, the gasket completely fills the groove 11 and the lip 19 is turned inwardly of the bell toward the high pressure side thereof and is compressed against the flaring side 12 of the groove 11. When thus assembled, I have found that the gasket will withstand pressures up to the bursting pressure of cast iron pipe without leaking, and that the shoulder 12 of the bell more tightly engages the lip 19 of the gasket, thereby more effectively preventing separation of the joint, without any further mechanical restraint, up to several hundred pounds per square inch. Joints made in accordance with my invention resist separation comparable to the well known gland type of bolted joint.

Referring now to Fig. 3 of the drawings, I show my improved joint embodied in a coupling 22 with associated spigot members 23 and 24 shown as steel pipe, but it is obvious that the same means of coupling can be applied to plain end pipe made of cast iron or any suitable material. The form illustrated in Fig. 3 is such as is used with new work when the pipe is first being laid and the coupling may be assembled on the associated spigot ends of the pipes 23 and 24, an internal rib 25 serving to center the coupling. In all other respects the form shown in Fig. 3 is similar to that already described in Figs. 1 and 2 of the drawings.

Referring now to Fig. 4 of the drawings, I show a gasket 29 which is in all respects similar to the gasket 17 except that on its inner surface it is provided with serrations, or ridges 31, inclined inwardly, which permit the ready entry of the spigot but which act as barbs to prevent separation, and thus provide a better grip on the associated spigot end of the pipe. I have found that when the gasket is thus formed it has even greater separation resisting power than the other form described.

In assembling my improved joint, especially with large diameter pipe, it is contemplated that a pulling jack (not shown) of the wire stretcher, or other suitable type, be employed to pull the plain ends into the bell ends and thereby to stretch and distort the gaskets in the joint into extremely tight engagement with the spigot.

As is well known in the art, there have been devised many substitutes for rubber which are comparable to rubber in elasticity, density and resiliency, and other qualities which are desirable in a gasket. It may be more desirable to employ one of these rubber substitutes than natural rubber for the reason that they resist or are more insoluble with respect to some fluids and gases. It will be understood, therefore, that the term "rubber" as used in this specification, is intended to embody rubber substitutes such as are now on the market, it being essential that whatever substance is employed, it should have the necessary tensile strength, the elasticity, and the resiliency to produce the results described herein which are characteristic of my improved pipe joint.

From the foregoing, it will be apparent that I have devised an improved pipe joint which is capable of withstanding exceedingly heavy internal pressures and which will resist separation forces, due solely to the configuration of the gasket employed.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claim.

What I claim is:

A joint for bell and spigot type pipe, fittings and couplings comprising a bell and cooperating spigot, the bell having an annular inner groove near the outer end thereof, said spigot extending into the bell past said groove when assembled, the bottom of the groove being arcuate in cross section and having flaring sides, a shoulder in the bell adjacent the high pressure side of the groove, a rubber gasket partly circular in cross section to fit the bottom of the groove and the inner surface thereof having a substantially flat face flaring from the high pressure to the low pressure side, the gasket being smaller in internal diameter than the outer diameter of the spigot to provide for stretching and distortion thereof to fill the groove upon the entry of the spigot said distortion acting to form a locking lip on the gasket extending inwardly beyond and compressed against the shoulder to resist separation.

ARTHUR T. McWANE.